May 26, 1925.

T. M. RECTOR

BATTERY

Filed May 10, 1924

1,539,427

Thomas M. Rector, Inventor
By his Attorney
Frank J. Kent

Patented May 26, 1925.

1,539,427

UNITED STATES PATENT OFFICE.

THOMAS M. RECTOR, OF RUTHERFORD, NEW JERSEY, ASSIGNOR TO VITAPACK CORPORATION, OF NEW YORK, N. Y., A CORPORATION OF NEW YORK.

BATTERY.

Application filed May 10, 1924. Serial No. 712,221.

*To all whom it may concern:*

Be it known that I, THOMAS M. RECTOR, a citizen of the United States, residing at Rutherford, in the county of Bergen and State of New Jersey, have invented certain new and useful Improvements in Batteries, of which the following is a specification.

This invention relates generally to the construction of dry batteries and more particularly to a battery construction designed to prevent deterioration of the battery in the period of time elapsing between the manufacture of the battery and the placing of it into use by the ultimate consumer.

In the recent development of relatively small dry-batteries for use in radio installations and with flash-light lamps, the problem of preventing the corrosion of the contact terminals and the deterioration of the cells through chemical action is a serious one. This deterioration of the battery through chemical action is relatively much greater with the small type of battery because of the greater surface in proportion to volume presented in the small battery. The corrosion of the contacts is particularly objectionable in radio work where good electrical contacts are necessary.

The present invention contemplates the packing of batteries of this and other dry-cell types in an atmosphere of inert gas held in a hermetically sealed container. The presence of the inert gas serves a double purpose, first, it prevents oxidation of the contact points through the exclusion of oxygen thereto, and second, it adds to the life of the battery by preventing other chemical changes which depend upon the presence of oxygen.

Other features of the invention will be hereinafter referred to.

Figure 1:
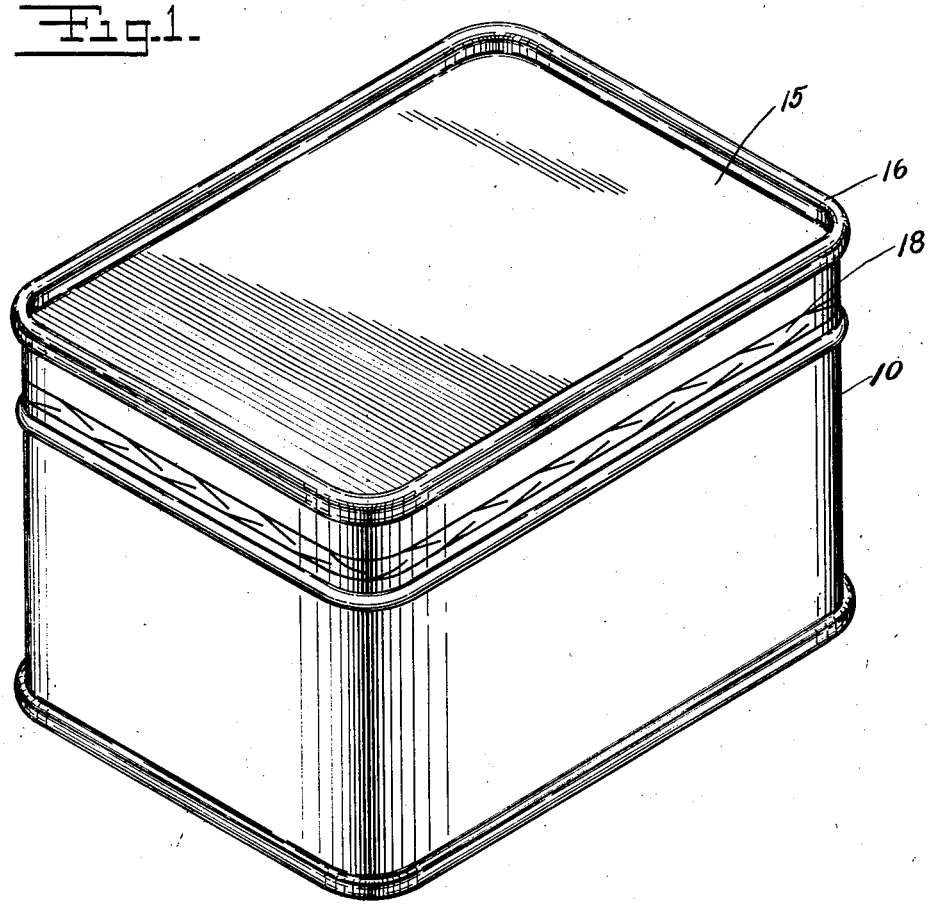

In the drawings, in which a preferred embodiment of the invention has been selected for illustration, Figure 1 is a view in perspective of a dry-cell battery embodying the invention.

Figure 2:
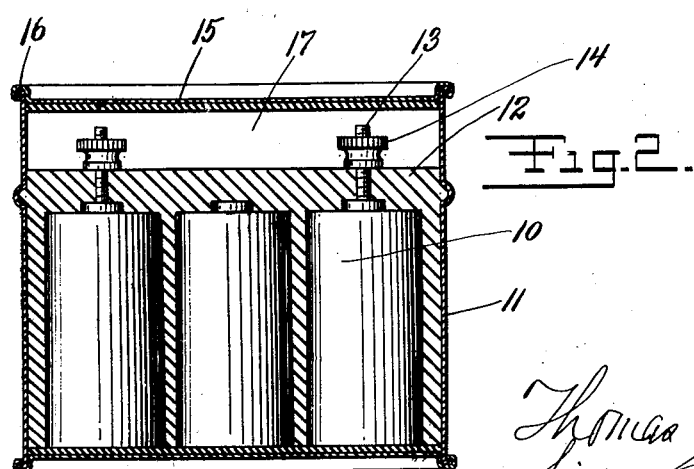

Figure 2 is a view in vertical section and on a somewhat reduced scale of the battery shown in Figure 1.

Referring to the drawings for a more detailed description of the invention, a battery of the dry-cell type is shown in which dry cell units 10 are enclosed in a container 11 in relatively spaced apart relation from each other and with a mass of packing or sealing material in the form of sealing wax 12 filling the space between the individual cells and the inner surfaces of the wall of the container 11. Certain of the cells are provided with upwardly extending contact members 13 which penetrate the layer of wax 12 overlying the upper ends of the cells and are provided with suitable knurled nut members 14 by the use of which conductor terminals can be attached to the contact members in a known manner. It will be apparent that a contact terminal will be provided for connection with one element of each of the cells and that a series of contacts may be individually connected to the remaining elements of all the cells in order to provide currents of different voltages as will be clear.

In order to prevent the escape of moisture from the interior of the cell units 10 along the lateral surfaces of the contact members to the exterior of the wax sealing mass 12 the container 11 in which the cell units 10 are placed is extended above the upper extremities of the contact members 13 and is provided with a cover member 15 having a sealed connection at 16 with the upper edge of the container. This arrangement provides a space or chamber 17 surrounding the terminal members 13 and which forms a hermetical seal for the battery as a whole.

Advantage is taken of the chambered space 17 afforded by the upwardly extending container 11 utilizing inert gas in which to maintain the contact members 13 constantly immersed in order to prevent oxidation of the contacts between the time that the battery is sealed and the time that it is opened and put into use by a user. In order to achieve this the space 17 is evacuated of air and filled with an inert gas at the time that the cover member 15 is sealed into engaging relation with the upper edge of the container 11.

Not only does the presence of the inert gas prevent oxidation of the contacts so that the polished or burnished condition thereof in which they leave the factory is retained with the result that an effective electrical contact can be made therewith when a conductor terminal is applied thereto when the battery is subsequently put into use, but the absence of oxygen in the chamber 17 prevents other chemical action which would be likely to occur in batteries of this special type. By thus maintaining the contact end of the battery continually immersed in an inert gas the "shelf life," that is, the period of time elapsing between the sealing in of the battery and the putting of it into use is indefinitely prolonged with the prevention of chemical action. As will be clear this is due to the absence of oxygen and tends to the prolongation of the life of the battery as a whole.

In order to facilitate the opening of the container in order to put the battery into use I contemplate the scoring of the side walls of the chamber space 17 as at 18 in order to provide a weakened strip which can easily be torn and unrolled from its position by the use of a key in an obvious manner.

What is claimed is:

1. In a dry-battery construction, a cell unit, a sealed container for the cell unit sufficiently larger than the cell to provide space between the cell and the walls of the container, insulating material separating the cell and the container, and the remaining space in the container being filled with an inert gas.

2. In a dry-battery construction, a cell unit having a contact terminal extending upwardly therefrom, a sealed container for the cell unit sufficiently larger than the cell to provide space between the cell and the walls of the container, sealing material filling the space and covering the top of the cell but with the contact terminal protruding upwardly therethrough, and the space in the container surrounding the contact terminal being filled with an inert gas.

3. In a dry-battery construction, a plurality of cell units having contact terminals extending upwardly therefrom, a sealed container for the cell units sufficiently large to arrange the cells with space therebetween and between the cells and the container walls, insulating material separating the cells and the containers, and the remaining space in the container being filled with an inert gas.

4. In a dry-battery construction, a plurality of cell units having contact terminals extending upwardly therefrom, a sealed container for the cell units sufficiently large to arrange the cells with space therebetween and between the cells and the container walls, sealing material filling the spaces between the cells and between the cells and container walls and covering the tops of the cells but leaving the contact terminals protruding upwardly therethrough, and the space surrounding the contact terminals being filled with an inert gas.

5. In a dry-battery construction, a plurality of cell units having contact terminals extending upwardly therefrom, a sealed container for the cell units sufficiently large to arrange the cells with space therebetween and between the cells and the container walls, sealing material filling the spaces between the cells and between the cells and container walls and covering the tops of the cells but leaving the contact terminals protruding upwardly therethrough, the walls of the container extending above the contact terminal and having a closure member sealed thereto to form a chamber, said chamber being filled with inert gas, and said chamber walls including a strip of material arranged to be torn from its place to release the container top and provide access to the terminals.

In testimony whereof I affix my signature.

THOMAS M. RECTOR.